3,093,601
COMPOSITION COMPRISING AGGREGATE, RUBBER AND A STEAM-CRACKED PETROLEUM RESIN

Albert M. Gessler, Cranford, and William J. Sparks, Westfield, N.J., assignors to Esso Research and Engineering Company, a corporation of Delaware
No Drawing. Filed June 30, 1960, Ser. No. 39,767
8 Claims. (Cl. 260—5)

This invention relates to novel compositions comprising aggregates and/or fillers bonded with a bonding agent containing a steam-cracked petroleum resin and a natural or synthetic rubber.

This application is a continuation-in-part of Serial No. 831,043 filed Aug. 3, 1959 to Albert M. Gessler and William J. Sparks, which describes the use of steam-cracked petroleum resins either alone or mixed with additives such as natural or synthetic rubbers as bonding agents for aggregates.

It has now been discovered that the use of a natural or synthetic rubber in the bonding compositions containing a steam-cracked petroleum resin yields increased flexibility and suppleness and provides excellent low temperature properties and high impact strength for aggregates bonded therewith.

The bonding compositions of the invention include two necessary components (1) a steam-cracked petroleum resin, and (2) a natural or synthetic rubber. From 2 to 40, preferably 5 to 25 parts by weight of rubber is used per 100 parts of steam-cracked petroleum resin in the bonding compositions. Mixtures of steam-cracked petroleum resins and/or mixtures of rubbers can be employed. The bonding compositions can optionally contain other ingredients such as from 1 to 40%, preferably 5 to 20%, based on the weight of steam-cracked petroleum resin, of various types of additives such as plasticizers e.g. mineral oils, fatty oils, waxes, and natural or synthetic resins, e.g., hydrogenated abietate, coumarone-indene resins, natural petroleum resins, thermal or catalytic-cracked petroleum resins, (which have undesirably higher aromatic content, higher sp. gr. and higher cold/hot viscosity ratio (300° F./500° F.) than steam-cracked petroleum resins), chlorinated paraffin wax resins, styrene-isobutylene resins, or high styrene-low diene resins. Such plasticizing or softening additives permit the use of steam-cracked thermoplastic resins of much higher softening point and the employment of larger amounts of rubbers than would be practical without them.

Various types of steam-cracked petroleum resins may be used for carrying out the invention, but generally any thermoplastic relatively linear type steam-cracked petroleum resin having a softening point between about 125° F. and about 230° F., preferably between 150° F. and 215° F., of low aromatic content and substantially free of crosslinking, can be used. These resins also should have a melt viscosity (cps.) of about 100–30,000, preferably about 150–20,000, at practical hot mixing and forming temperatures of about 200–500° F., preferably 250°–400° F. These resins also desirably should have a cold/hot viscosity ratio (300° F./500° F.) below 40, preferably about 1–20. The average molecular weight of these resins is about 1,000 to 1,500; and their sp. gr. (25/25° C.) is about 0.96–0.98, and generally about 0.97.

These resins are essentially methylated or other alkylated paraffin chains containing only a small amount of unsaturation, either of trans type II or terminal double bond. Tertiary hydrogen atoms produce misleading results when the material is analyzed for unsaturation by the Wijs iodine method unless a correction is made for substitution. An iodine value of 120 by the usual (Wijs) method when corrected for the presence of hydrogen halide from substitution gives a corrected iodine value of 23. The C/H ratio is about 6.0–7.0, preferably 6.2–6.6. Additional properties and methods of preparing the steam-cracked petroleum resins of the invention are given on pages 3 through 8 of the parent application which are incorporated herein by reference.

The natural or synthetic rubbers useful in the present invention include natural hevea, natural balata, neoprene which is a homopolymer of 2-chlorobutadiene, butyl rubber which is a copolymer of isobutylene with a conjugated diolefin such as isoprene, butadiene, dimethyl butadiene, piperylene, etc., chlorinated butyl rubber which is butyl rubber having a chlorine content of from 0.1–10 wt. percent, brominated butyl rubber, diene-nitrile rubber, SBR which is a series of copolymers of about 75 wt. percent butadiene and 25 wt. percent styrene, polyisobutylene, polybutadiene, polyisoprene, ethylene-propylene copolymers, polyesters, polysilicones, sulfide rubber, etc. The particular rubber employed is not important so long as the rubber has a molecular weight (vis. average) of 20,000 to 1,000,000, preferably 100,000 to 500,000.

The above bonding compositions are employed with aggregates in amounts of from 2 to 8%, preferably 4 to 6.5% by weight of bonding composition based on the weight of aggregate.

The aggregates to be used according to the invention are inert inorganic solids of numerous conventional types or certain specially adapted types, as will be discussed further herebelow. For thin sections or surface layers, e.g., about $\frac{1}{16}''$ to $\frac{1}{2}''$ or so, a fine aggregate should be used, such as a sand having a grading of about $\frac{1}{4}''$ down to 100 mesh, or a finer sand ranging from 8 mesh to 100 mesh may be used; or even finer fractions may be used, such as 20 mesh to 100 mesh, and with any of these, some powdered filler may be used, such as ground limestone, pulverized sand, silicas, clays, etc. By "fine" aggregate is meant an aggregate having a particle size of from $\frac{1}{4}''$ to 100 mesh. By "powdered filler" is meant a filler having a particle size of 100 mesh, or less ranging down to 10 m$\mu$ in particle diameter. For coarser sections, slabs or bulk articles, e.g., from $\frac{1}{2}''$ to 1 foot, or 5 feet or more in thickness, with or without an over-lying finer surface coating, large crushed aggregates may be used, such as crushed stone, gravel and air-cooled slag, having either a mixed grading of $\frac{1}{2}''$ to 3", or $\frac{1}{4}''$ to 2" or $\frac{1}{2}''$ to 1", etc. Alternatively, if a fairly thick section, e.g. 2" to 1 foot or more is to be used without any finer surface coating, the aggregate used may be composed of both coarse and fine aggregate and may include a dust filler, such as a mixture of 100 parts by weight of coarse stone, 80 parts by weight of sand, and 4 to 5 parts by weight of powdered limestone. The above aggregates may be graded either for density and lowest voids, or for a controlled desired amount of voids, e.g., 3%, 5%, 8%, etc. voids. By "coarse" aggregate is meant an aggregate having a particle size of from $\frac{1}{4}$ to $\frac{3}{4}$ inch.

If desired, the powdered fillers to be used, e.g., crushed silicas, clays, ground limestone, or even carbon black, etc. may be subjected to severe attrition, e.g. by ball-milling with steel balls, or roll-milling one or several times through tight set steel rolls, or stamping or any other severe attrition, prior to mixing with the polymer to be coated. It has been found that such severe attrition activates the surface of the filler particles at the places where the particles have been broken or otherwise attrited, and thereby provides a tighter bond when the resin is subsequently coated thereon, and the mixture is shaped, compacted and cooled.

Various methods may be used in carrying out the present invention, depending upon various factors such as the particular type of resin composition used, the type of aggregates used and according to the type of mixing equipment available. The preferred technique, referred to as hot plastic mixing, is to heat the resin composition to be used, to a temperature about 100–300° F. above its softening point, until it has softened to a hot fluid consistency, and then stir the aggregate, preferably dried and preheated, into it, preferably gradually, until the final composition comprises about 90 to 99% by weight of aggregate and about 1 to 10%, preferably about 2 to 8% by weight of resin.

Thus, for example, a steam-cracked petroleum resin having an average mol. wt. of about 1,100, which has a softening point of about 212° F. (by Ring-and-Ball Method, ASTM standards, D36–26) may be heated to a temperature of about 300 to 450° F. and then a sand having a grading of about ¼″ down to 100 mesh, preheated to a similar temperature, is gradually added with continued mixing until the mixture contains about 95% by weight of sand and 5% of resin and is substantially homogeneous. This hot mixture is then ready for use in forming blocks, slabs, or other articles, or for application to a road surface where it is then compacted by rolling or tamping or any other suitable method. Alternative resin compositions may be used, such as one having a softening point of 158° F. or 185° F. or a mixture of about 40 to 80% by weight of 212° F. softening point resin mixed with about 20 to 60% by weight of similar steam-cracked petroleum resin having a softening point of 158° F., each being polymerization products of a feed in which the reactants comprise essentially about 25% aliphatic dienes, and about 75% aliphatic alkenes.

Resin-sand-rubber compositions with or without other modifiers may be hot-molded in the shape of ordinary bricks or "concrete blocks," and used for building walls, floors, partitions, etc., or for special paving purposes, such as a surface coating on bridges, which are subject to excessive vibration, wide temperature fluctuations, etc., where concrete, asphalt paving and wooden blocks are not as satisfactory as desirable.

For paving highways, airport runways, airplane carrier decks, parking lots, bus stations, etc., the bonded aggregate compositions of the invention may be hot-rolled directly in place, either as a thin surface layer, e.g. ¼″, ½″ or an inch or so thick, or, together with coarse aggregate, as a 2″ to 8″ or thicker load-supporting base layer, and then covered with a thin seal coat on the surface. Depending on the color of the fine aggregate used, or the dust filler used (if any), the surface layer will be found to be lighter than conventionally used asphalt surfacing, and therefore will give better visibility for night driving, particularly when the roads are wet.

A great advantage of the present invention is that the bonded aggregate compositions of the invention are all pale yellow to essentially colorless, i.e. a Gardner color preferably as light as or lighter than 15, and therefore when mixed with sand, with or without filler, they can easily be given any desired color by adding a relatively small amount of a pigment. For instance, for a white, or light gray, a few (e.g. 0.5–5.0) percent of white titanium dioxide pigment may be used. For other purposes, red, yellow, orange, green, blue, or even black pigments may be used, as for identifying traffic guides or certain areas of paving, etc., or for ornamental purposes, in manufactured articles, etc.

Another novel method of using the compositions of this invention is to hot mix the aggregate and bonding composition and then sheet the resulting mixture out into thin sheets or films ranging from ¼″ thick to 1/16″, 1/32″ (or even thinner if a finer sand or only dust filler is used), by passing the hot mixture through one or more pairs of rolls cold enough to make the sheet maintain its shape, and additionally cooling, if necessary, with cold air, water spray, or a water bath, drying, and finally rolling up the resulting flexible strip into large rolls. These rolls, which may be any desired width, such as only 2″ to 1 foot in width for marking traffic lines on highways, etc. up to 4 feet, 6 feet, 8 feet, or more in width for laying down a light-colored surface coating to lighten up the color of an asphalt highway or to smoothen over a rough concrete highway. Such a strip roll material may also be used in place of conventional tar paper for covering sloping roofs, or, where they are especially advantageous, for flat roofs, because such resin-bonded sand is not subject to serious deterioration by oxidation and cracking as is the case with asphalt. For roofing purposes, one or two percent of carbon black may be added to the composition in order to stabilize against the depolymerizing effect of ultraviolet light and sunlight, or colorless ultraviolet light absorbers may be added.

The composition of this invention may also be used for paving the beach runways, beach groins, jetties and levees, either by hot rolling method, or coating with preformed thin slabs or strip rolls.

Numerous molded or extruded articles may be formed from these resin-bonded aggregate compositions. Conduit pipe may be extruded in various dimensions, e.g. from small sizes such as ½″ inside diameter to larger and thicker conduits of 5″ or 6″ inside diameter. With a light-weight vermiculite filler, instead of or in addition to fine sand or other filler, these compositions make excellent sound-deadening thermal insulation. Acid-resistant battery boxes may readily be molded from these compositions. Likewise, smaller, thinner articles such as phonograph records, as well as numerous pans, buckets, bowls, or other containers, various tools, or tool-handles, doorknobs, telephone receivers, instrument housings, electrical insulators, etc. may be readily made by selection of appropriate thermoplastic steam-cracked petroleum resin, rubber, and type and screen size of filler, within the purview of the present invention.

Large or bulky articles may be formed, either by molding or tamping, e.g., railroad ties, large diameter pipes, e.g., 1 foot or 5 feet or more in diameter, with or without steel wire or mesh reinforcing, for conducting water, or for use in sewage systems, or gas mains, or for transporting crude oil or refined petroleum liquids. Other hydraulic structures include water tanks, reservoirs, dam spillways, etc., or storage tank bottoms, etc. Pre-cast structural columns, e.g. telephone poles, piles, etc. may be made. Such piles have the advantage that sections thereof are joinable by thermoplastic welding, i.e. by heat-softening the ends of two units which are then combined under suitable pressure and permitted to cool until solidified.

With bonded fine aggregate compositions, they may be further modified by the addition of a small amount, e.g. 10 to 75% by weight, of a volatile solvent, such as naphtha or kerosene, toluene, etc., sufficient to give fluidity for application by painting with a brush, or spray painting or a more plastic consistency suitable for troweling in place, or by coating on flat surfaces as with a doctor blade, etc. by machine. Relatively thin coatings of the bonded fine aggregate may advantageously be applied by a hot rolling or hot pressing technique onto the surface of concrete blocks or cinder blocks, either just on the exterior side to be exposed to the rain and weather or in contact with wet earth as in a house foundation, or may be applied to both the interior and exterior surfaces.

For coating either small or large diameter pipes or for protecting electric cables to be placed underground or underwater, one or more layers of bonded fine aggregate having a thickness ranging from a few mils to an inch or so (or even thicker) if handled in the heated condition, can be applied by the spiral strip coating method. The present compositions are low enough in cost to economically permit the use of coatings ⅛″ or ¼″ or so in thickness around large steel pipe, to prevent corrosion whereof, whereas the relatively thin films of polyethylene now sometimes used for such spiral coating of steel pipe, are so thin that they are readily subject to mechanical damage by contacting with rough, rocky surfaces or by contact with mechanical equipment or tools. On the other hand, it would be far too expensive to use sheets of plain polyethylene ⅛" or more thick.

The compositions of the present invention, at least when used in substantial thicknesses, are relatively fireproof or fire resistant, except when exposed to high temperatures over a long time. However, if desired to increase the fire resistance of articles made of the present compositions, various fireproofing materials may be incorporated such as highly chlorinated naphthalenes, phosphates, silicates, etc.

An additional method of using the compositions of this invention, not practical with materials available heretofore, is to make large sheets of slabs, containers, piping, etc. by a technique analogous to that used in making corrugated paper board, but using thermoplastic heat-sealing for bonding a flat sheet of bonded aggregate composition on either one side or both sides of a corrugated sheet of similar bonded aggregate. Such corrugated sheets may be readily made while the sheet is still in a hot forming condition. For effecting the desired heat-sealing, the outer edges of the corrugated sheet may be passed near or through a hot flame or other heating element, and the side of the flat sheet to be bonded therewith may also be heated at least sufficiently to make it tacky so that it will bond readily to the corrugated surface when contacted therewith under slight pressure. Laminated slabs of great strength can be made by bonding together two or more of the resulting corrugated slabs, with the corrugation "grain" at right angles to each other.

The details and advantages of the invention will be better understood from a consideration of the following specific examples:

EXAMPLE I

Natural rubber (high grade smoked sheets) was mixed with half its weight of naphthenic base oil (Necton 60). The oil was added to the rubber on a 2 roller mill at 140–150° F.

50 parts by weight of this plasticized natural rubber was mixed with 150 parts of steam-cracked petroleum resin (Piccopale 100) on a 2 roller mill at 300° F.

The resulting mixture was used as bonding composition at 6.5 weight percent with conventional F.A.B.C. stone-sand aggregate (78 grams of bonding composition and 1122 grams of aggregate). The mixture was made at 300–320° F. A Marshall pellet (see "The Marshall Method for the Design and Control of Bituminous Paving Mixtures"; Marshall Consulting & Testing Laboratory; (copyright, 1949) was formed from this paving mixture, the compaction being accomplished at 270–290° F., using 50 blows on each surface of the pellet. When tests were made with this pellet at 140° F., the following data were obtained.

Marshall stability _____ 1500 lbs.
Marshall flow _____ 33.5 (in 0.1").

The unusually high Marshall flow—which was found in the above test is evidence of the rubberiness or flexibility of the binder system. In addition, no sand or stone was chipped out or broken away from this Marshall pellet, even after the pellet was struck repeatedly and sharply with a hammer. Similar paving mixtures with oil plasticized resin as the binder (no rubber) not only have lower Marshall flow, but are chipped or broken when they are struck with a hammer.

EXAMPLE II

The plasticized natural rubber of Example I was blended with petroleum resin (Piccopale 100) in the following formulations:

Piccopale 100 _____ 100.0 g.  100.0 g.  100.0 g.
Plasticized Natural Rubber__ 20.0 g.   25.0 g.   30.0 g.

The blending was accomplished on a 2 roller mill at 300° F., as already described.

A similar set of blends was made using naphthenic base oil (Necton 60) alone in place of the plasticized rubber.

Marshall pellets were prepared with each of the above blends as binders using:

G.
F.A.B.C. aggregate _____ 1122.0
Binder _____ 78.0

The mixtures were made at 300–320° F., and the pellets were compacted at 270–290° F., 50 blows being delivered on each surface of the pellet. The following data were obtained from testing these pellets at 140° F.

*Marshall Data at 140° F.*

| Additive, percent based on petroleum resin | Plasticized natural rubber | | Necton 60 | |
|---|---|---|---|---|
| | Stability, lbs. | Flow (0.1") | Stability, lbs. | Flow (0.1") |
| 20 | 2,900 | 30.0 | 2,150 | 22.5 |
| 25 | 1,950 | 30.1 | 1,800 | 22.0 |
| 33 | 1,500 | 26.0 | 1,650 | 16.0 |

The increased stability, and more particularly, the increased flow demonstrate the advantage of the high molecular weight, rubbery polymer as a plasticizer or flexibility increasing agent in these petroleum resin binder systems.

The invention is not intended to be limited by the specific examples which have been given only for purposes of illustration. Additionally, modification of the invention can be made without departing from the scope and spirit of the invention.

What is claimed is:

1. A composition comprising aggregate whose particles are of 100 mesh and coarser bonded with from 2 to 8% by weight of bonding composition comprising (1) a thermoplastic synthetic petroleum resin polymerized from steam-cracked olefins and diolefins, having a softening point (Ring-and-Ball Method) between about 125° F. and about 230° F., an average molecular weight of about 1,000 to 1,500, a specific gravity (25/25° C.) of about 0.96 to about 0.98, and a carbon/hydrogen ratio of about 6.0–7.0, and (2) from 2 to 40% by wt. based on the wt. of resin of a rubber having a molecular weight of from 20,000 to 1,000,000, said composition having a Marshall stability measured at 140° F. of at least 1,500 pounds.

2. The composition of claim 1 in which the resin has a softening point between about 150° and 215° F., and is a polymerization product of about 10 to 50% of aliphatic dienes and about 50 to 90% of alkenes, and has substantially no aromatic content, said polymerization product being formed in the presence of a Fridel-Craft catalyst at a temperature in the range of about −40° C. to 70° C.

3. The composition of claim 1 wherein said resin is derived from a steam-cracked petroleum naphtha fraction having a boiling range between about 20° C. and 280° C. having approximately the following composition:

Constituents:                                           Percent
    Aromatics _____ 19–49
    Diolefins _____ 8–25
    Olefins _____ 68–30
    Paraffins and naphthenes _____ 5– 1 of which only the diolefins and olefins are reactants.

4. The composition of claim 1 in which said resin has a softening point of about 212° F., an average mol. wt. of about 1,100, a specific gravity of about 0.97 and a bromine number of about 8.

5. Composition according to claim 1 in which said composition contains 0.1 to 5.0% of coloring pigment.

6. The composition of claim 1 wherein said bonding composition also contains from 1 to 40% by weight based on the weight of resin of a non-elastomeric plasticizer.

7. The composition of claim 1 wherein the rubber is employed in amount of 5-25% by weight.

8. The composition of claim 1 wherein the rubber is natural rubber.

References Cited in the file of this patent

UNITED STATES PATENTS

| | | |
|---|---|---|
| 2,721,185 | Schulze et al. | Oct. 18, 1955 |
| 2,823,194 | McKay et al. | Feb. 11, 1958 |
| 2,861,895 | Hardman | Nov. 25, 1958 |
| 2,894,925 | Morris et al. | July 14, 1959 |
| 2,914,501 | D'Ascoli | Nov. 24, 1959 |